United States Patent [19]
Dams et al.

[11] Patent Number: 5,829,106
[45] Date of Patent: Nov. 3, 1998

[54] CLOSING DEVICE

[75] Inventors: Francis Dams, Edegem; Patrick Clits, Houwaart; Pieter De Coster, Linden; Marc Demesmaeker, Antwerp, all of Belgium

[73] Assignee: N.V. Raychem S.A., Kessel-Lo, Belgium

[21] Appl. No.: 945,202
[22] PCT Filed: Apr. 23, 1996
[86] PCT No.: PCT/GB96/00967
§ 371 Date: Feb. 2, 1998
§ 102(e) Date: Feb. 2, 1998
[87] PCT Pub. No.: WO96/33922
PCT Pub. Date: Oct. 31, 1996

[30] Foreign Application Priority Data

Apr. 24, 1995 [GB] United Kingdom .................. 9508295

[51] Int. Cl.⁶ .......................... B65D 63/00; B65D 45/00
[52] U.S. Cl. .................................. 24/270; 24/271; 24/273
[58] Field of Search ........................ 24/270, 271, 272, 24/273, 274 P, 285; 285/365

[56] References Cited

U.S. PATENT DOCUMENTS

| | | |
|---|---|---|
| 1,518,479 | 12/1924 | Brewer ...................................... 24/273 |
| 2,628,811 | 2/1953 | Lockhart . |
| 2,752,174 | 6/1956 | Frost ......................................... 24/270 |
| 2,775,806 | 1/1957 | Love ......................................... 24/271 |
| 4,969,923 | 11/1990 | Reeder et al. ............................ 24/273 |
| 5,129,537 | 7/1992 | Bordner et al. . |

Primary Examiner—Victor N. Sakran
Attorney, Agent, or Firm—Herbert G. Burkard

[57] ABSTRACT

A toggle latch for releasably fastening and tensioning a closure band said latch comprising, a first member (20) for connection to an end of said band, a second member (22) for connection with the other end of said band, a lever (24) hingedly connected adjacent a proximal end with said second member (22) and a link member (27) hingedly interconnecting said first member (20) and said lever (24) and being joined to said lever (24) at a point spaced apart from said proximal end, said lever being movable between a first open position in which the extent of said lever (24) diverges from said band and a second closed position in which said lever (24) and link member (27) nestably overlay said first and second members (20, 22) to draw said first member (20) toward said second member (22).

29 Claims, 4 Drawing Sheets

CLOSING DEVICE

FIELD OF THE INVENTION

The present invention relates to closing devices of the over-centre type, particularly for closing housings, especially cable splice closure housings, either as part of the housing itself or as part of a clamp for fastening together first and second parts of the housing.

BACKGROUND OF THE INVENTION

EP 0 094 848B (Raychem) discloses an enclosure for protecting cable joints from the environment. The enclosure comprises two parts e.g. a closure and a base. The two parts are held together by a clamping ring which forces flanges on the two parts together. No details are given of the clamping ring.

U.S. Pat. No. 5,059,748 (Raychem) discloses a butt splice cable splice closure comprising a dome and base held together by a clamping ring. The ring is in two parts, which are hinged together at their ends opposite the hinge by a threaded bolt acting in threaded portions adjoining the ends of the parts of the rings.

GB 2 193 605A discloses a cable joint comprising a two part hollow sleeve and two end caps which can be clamped together by a clamping ring at each end. The clamping ring is in two parts hinged together with the ends remote from the hinge being provided with threaded portions which enable them to be brought together by means of a bolt.

Cable splice closures, for example for optical fibre cables, in which a base and a cover are fastened together by means of a clamp, e.g. a split ring clamp, which is closed in its clamping position by means of an over-centre closing device are commercially available.

A problem with conventional clamps is that it is often difficult for an engineer in the field to close a clamp around a cable splice closure housing, particularly when the clamp and/or the housing is/are new. Often the engineer has to resort to hitting the clamp with a hammer or a mallet (which may damage the housing and/or the cables, and generally makes installation difficult) in order to close it sufficiently so that the lever of the over-centre closing device of the clamp can be operated to close the clamp fully. It would therefore be desirable to make the initial stage of closing the clamp easier.

It is often necessary to re-open cable splice closure housings in order to gain access to the cable splices. Conventional cable splice closure clamps often suffer from the problem that they are difficult to remove from the housing of the closure once they have been closed, particularly when they have been closed for some time. At present, the engineer who opens a housing often has to use a separate tool (which, at least in some cases is a specially designed tool) to help him to open the clamp and remove it from the housing. It would desirable to remove the need for the use of such tools.

SUMMARY OF THE INVENTION

According to a first aspect of the present invention, there is provided an over-centre closing device for closing together first and second parts of an article, comprising a lever pivotally attached to an arm which is pivotally mounted to the first part of the article, the lever having an engagement surface which engages the second part of the article and fastens the two parts of the article together when the lever is in its over-centre position in use, wherein the lever has an extension which extends beyond the engagement surface and which may cooperate with the second part of the article to provide initial closing leverage during an initial stage of closing the article and which allows the engagement surface to contact the second part of the article to provide final closing leverage during a final stage of closing the article.

The first aspect of the invention has the advantage that because the lever has an extension which may cooperate with the second part of the article (the article may, for example, comprise a clamp, or a housing itself) to provide initial closing leverage during an initial stage of closing the article, this initial stage of closing the article is made easier and normally avoids the necessity of hitting the clamp, thereby solving the first problem mentioned above.

According to a second aspect of the invention, there is provided an over-centre closing device for closing together first and second parts of an article, comprising a lever pivotally attached to an arm which is pivotally mounted to the first part of the article, the lever having an engagement surface which engages the second part of the article and fastens the two parts of the article together when the lever is in its over-centre position in use, wherein the lever has an extension which extends beyond the engagement surface and which may cooperate with the second part of the article to provide an initial opening leverage during an initial stage of opening the article.

The second aspect of the invention has the advantage that because the lever has an extension which extends beyond the engagement surface and which may cooperate with the second part of the article to provide an initial opening leverage during an initial stage of opening the article, the necessity of using a separate tool to facilitate opening of the clamp is avoided, thereby solving the second problem mentioned above. Advantageously, the leverage provided by the closing device of the invention provides at least some radially outward movement of the clamp, e.g. radially away from a housing around which it is positioned. This normally enhances the ease with which the clamp may be opened and removed, and is particularly difficult to achieve without the extension of the lever according to the invention.

Preferably the first and second aspects of the invention are combined in a single over-centre closing device.

Preferably the second part of the article has a protrusion, and the cooperation of the extension of the lever with the second part of the article comprises contact between the extension and the protrusion. Advantageously, the extension may have a hook-like part which engages the protrusion during the cooperation of the extension with the protrusion.

The article may comprise a housing, preferably a cable splice closure housing. Preferably, however, the article comprises a clamp, especially a clamp in the form of a split ring. The split ring may be non-circular, e.g. oval or angular, but normally it will be substantially circular when closed. The split ring is preferably hinged to enable it to be opened, placed around a housing etc., and closed in place. The invention may consequently provide a clamp for fastening together first and second parts of a housing, comprising a split ring and an over-centre closing device according to the invention, the split ring comprising the article and the over-centre closing device closing the split ring in a clamping position in use. The housing preferably comprises a cable splice closure housing. The clamp preferably fastens together peripheral flanges on the first and second parts of the housing. The clamp is preferably provided with means, e.g. angled portions, which cooperate with corresponding portions, e.g. flanges, on the parts to be clamped so that closing of the clamp urges the parts together.

Preferably a pair of extensions are provided on the lever, each of which preferably cooperates with a protrusion on the second part of the article (e.g. clamp).

The invention will now be described, by way of example, with reference to the accompanying drawings, in which:

DETAILED DESCRIPTION OF THE PREFERRED EMBODIMENTS

Figure 1:
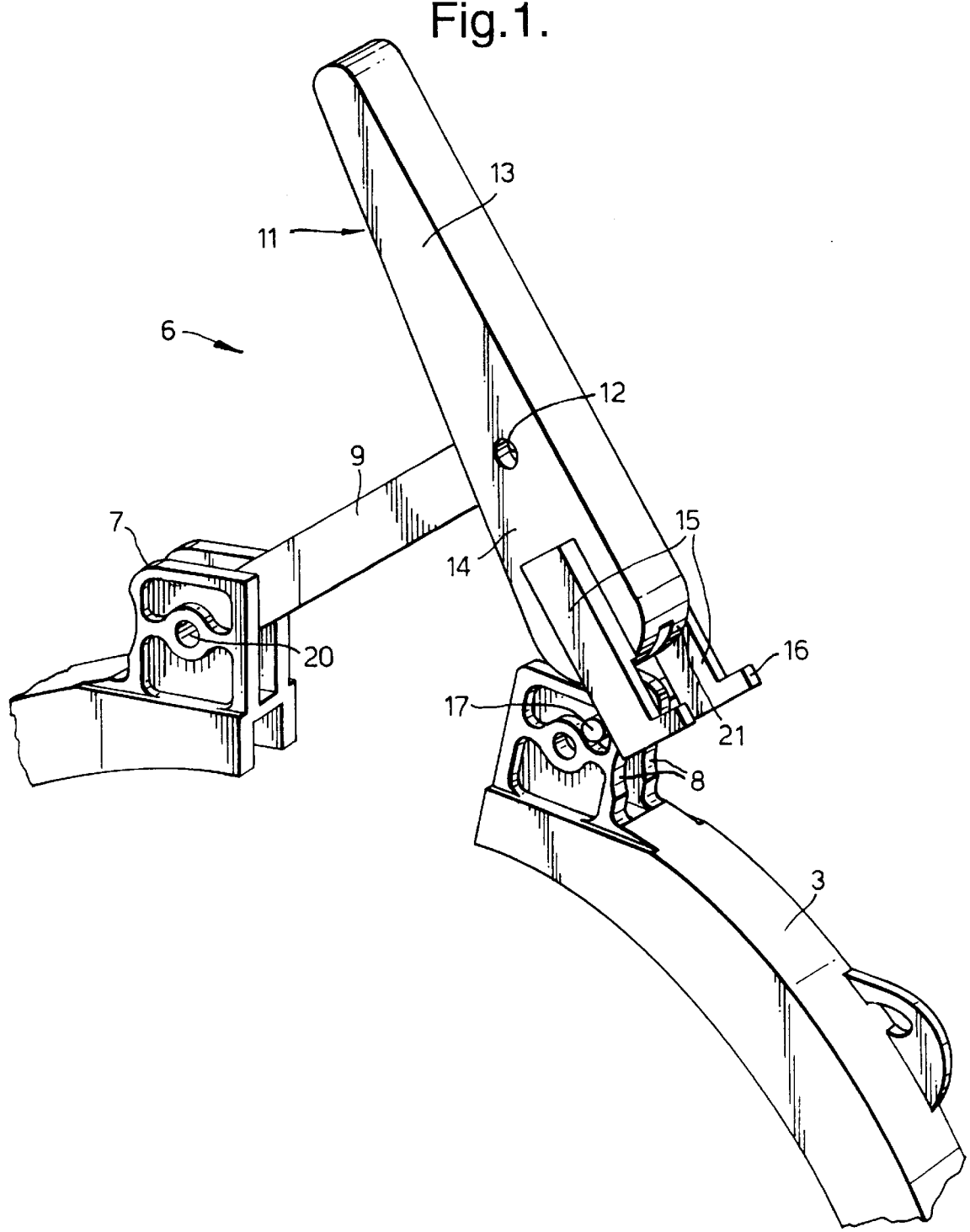
FIG. 1 is a perspective view of a clamp according to the invention prior to the initial stage of closing.
Figure 2:
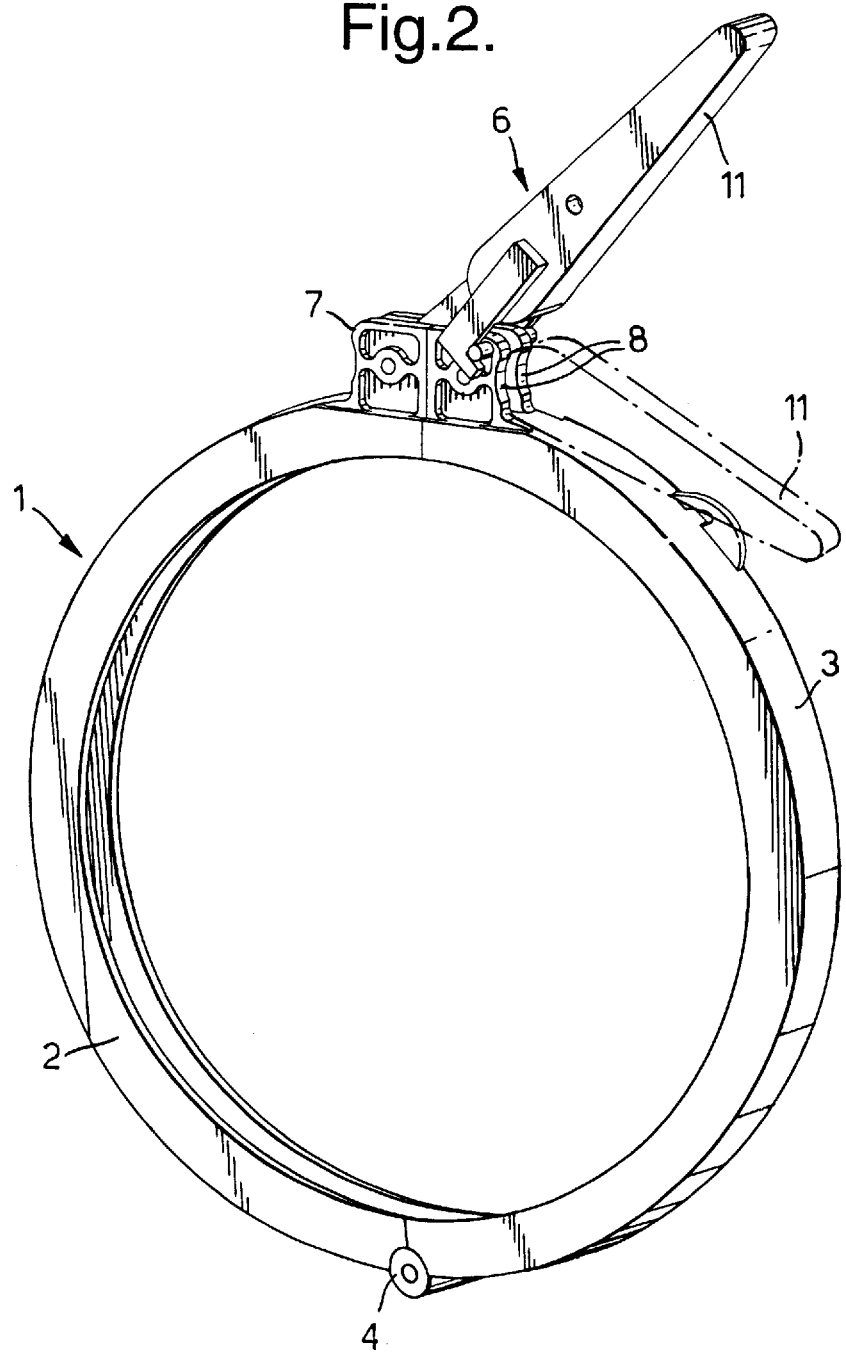
FIG. 2 is a perspective view of the clamp of FIG. 1 in the closed position prior to the initial stage of opening.

FIG. 1 is a perspective view of part of a clamp 1 according to the invention. The clamp comprises a split ring (e.g. for closing around peripheral flanges of a cable splice closure housing) having a first part 2 and a second part 3 (the entire clamp is shown in FIG. 2). The closing device 6 of the clamp 1 comprises a lever 11 pivotally attached at 12 to an arm 9 which is pivotally mounted at 20 to the first part 2 of the clamp. The lever 11 has an engagement surface 21 which engages the second part 3 of the clamp at 8 and fastens the two parts 2, 3 of the clamp together when the lever is in its over-centre position in use (which is shown in dotted lines in FIG. 2). The lever has two extensions 15 which extend beyond the engagement surface 21 and which, as shown in FIG. 1, may cooperate with the second part 3 of the clamp by contacting looking means including protrusions 17 (which are preferably in the form of pins) to provide initial closing leverage during an initial stage of closing the clamp. In this mode of operation therefore, the extensions 15 increase the stroke of the lever 11 in comparison to conventional levers without such extensions. Although, in this mode of operation, the amount of leverage provided by the lever is reduced due to the use of the extensions, it is normally sufficient for this initial stage of closing the clamp. In conventional closing devices, this help during the initial stage of closing the clamp is not provided due to the absence of such extensions, and consequently closing the clamp sufficiently to enable the closing device to close the clamp fully may be difficult.

Figure 3:
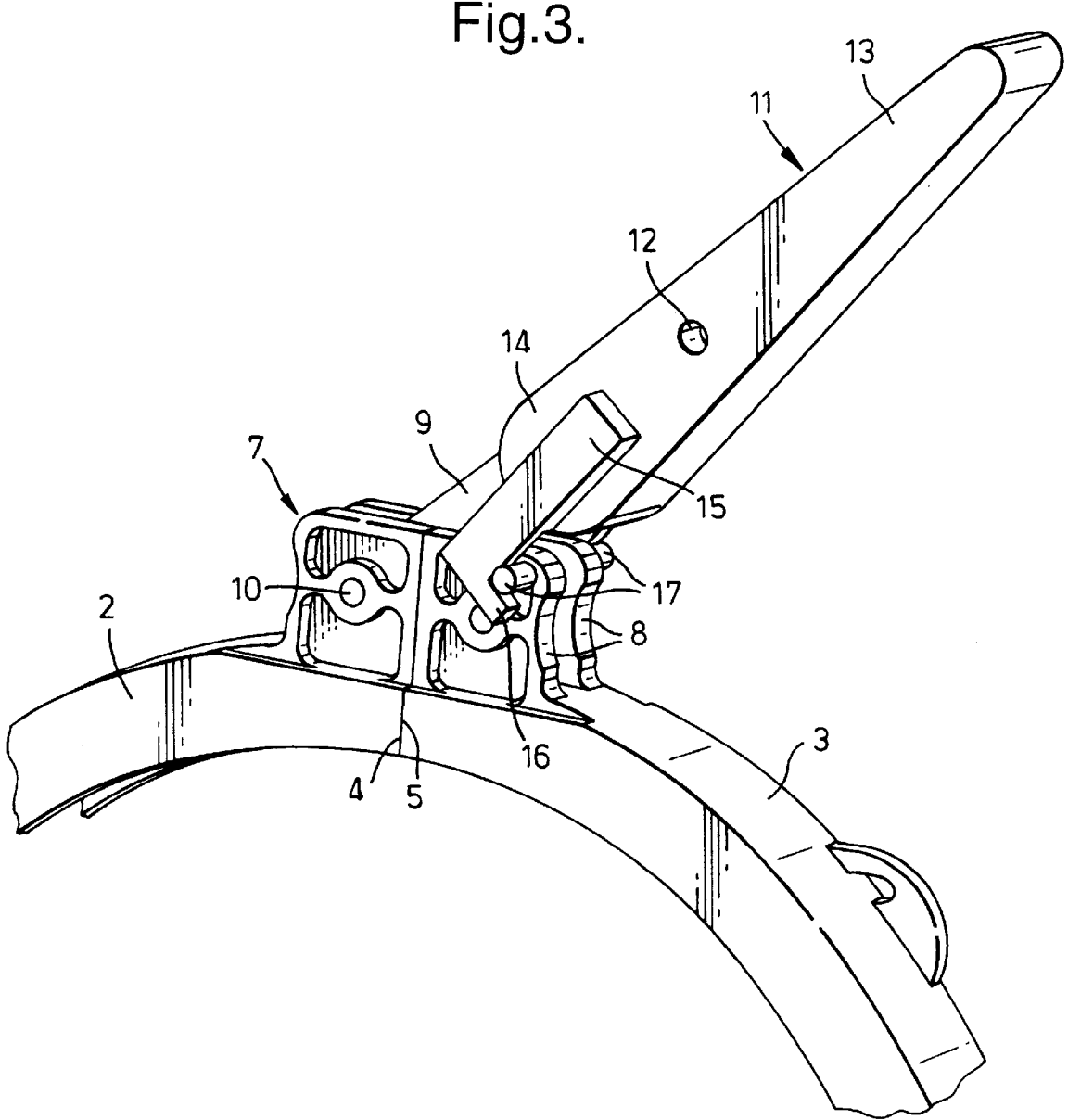
FIG. 3 is an enlarged view of the clamp of FIG. 2. showing the closing device in detail.
Figure 4:
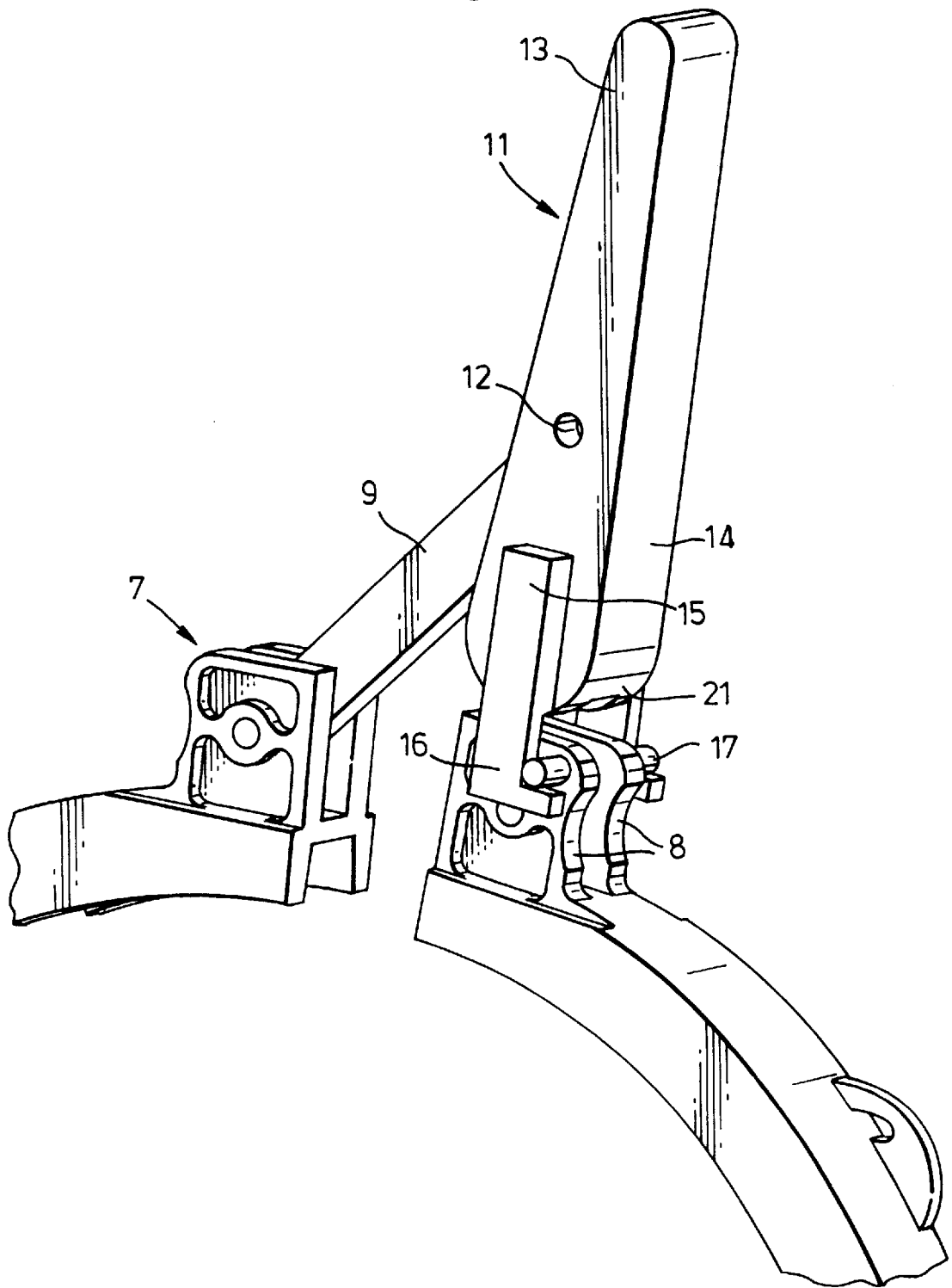
FIG. 4 is an enlarged view of the clamp of FIGS. 1 to 3 subsequent to the initial stage of opening.

FIG. 2 shows the clamp 1 of Figure in its closed position. The whole of the clamp is shown, and a hinge 4 between parts 2 and 3 is illustrated. The final over-centre position of the lever 11 is shown in dotted outline, and the fully drawn lever is shown prior to its use as an initial opening leverage during an initial stage of opening the clamp. The closing device 6, including the lever 11, is shown in greater detail in FIG. 3. Hook-like parts 16 on the end of extensions 15 are shown engaged with protrusions 17. In FIG. 4, the lever 11 has been used to provide an initial opening leverage to open the split ring clamp, via the engagement of the extensions 15 with the protrusions 17. Preferably this leverage imparts at least some radially outward force to the clamp which helps to release it from the housing. Thus FIGS. 2 to 4 illustrate the second advantageous feature of the invention, namely making the opening and removal of the clamp easier than is the case with conventional clamps. Conventionally a separate tool is normally needed in order to enable the clamp to be opened. The invention removes the need for this separate tool and provides a simple and effective mechanism for opening the clamp.

The clamp, and particularly the closing device, shown in FIGS. 1 to 4 illustrate how both advantageous features of the invention (i.e. ease of closing the clamp and ease of opening the clamp) may be combined in a single embodiment.

We claim:

1. A clamp comprising:

first and second split ring clamp members, each split ring clamp member having first and second end;

means pivotally connecting first and second split ring clamp members at their first ends for allowing pivotal movement of the second ends between an open, unlocked position and a closed, locked position;

a pivot arm pivotally connected to the first split ring clamp member adjacent to the first end;

a lever arm pivotally connected to the pivot arm and movable between an unlocked position and a locked position when the lever arm is drawn downward toward the second split ring clamp member to draw first and second split ring clamp members together, and said lever arm including an end forming an engagement surface;

locking means positioned on the first end of the second split ring clamp member for receiving the engagement surface of the lever arm and locking same when the lever arm is drawn downward into the locked position; and extension surface means positioned on the lever arm and extending outwardly from said extension surface means for engaging said locking means and increasing the leverage force of the lever arm during movement between one of into or out of a locked position.

2. A clamp according to claim 1 wherein said locking means comprises lever arm engaging means for receiving the engagement surface of the lever arm and locking the lever arm in the closed, locked position.

3. A clamp according to claim 1 wherein said locking means comprises a protrusion 17 for engaging said extension means during movement of said first and second split ring clamp members into open, unlocked and closed, locked positions.

4. A clamp according to claim 3 wherein said protrusion comprises at least one pin extending from said locking means for engaging said extension means.

5. A clamp according to claim 3 wherein said extension means comprises a longitudinally extending extension member, including a hook for engaging the protrusion on the locking means and increasing the leverage force of the lever arm during movement into the unlocked position from the locked position.

6. A clamp according to claim 3 wherein said extension means comprises a longitudinally extending extension member having a side surface for engaging said protrusion and increasing the leverage force during movement into the locked position from the unlocked position.

7. A clamp according to claim 1 including means pivotally connecting said lever arm to said pivot arm along a medial portion of the lever arm.

8. A clamp according to claim 1 wherein said pivot arm includes two opposing ends, and pivotally connecting one end to said first clamp member and means pivotally connecting the other end to said lever arm.

9. A clamp according to claim 1 wherein said extension means comprises at least two parallel, longitudinally extending extension members.

10. A device for clamping together first and second parts of an article that are movable between an open, unlocked position and a closed, locked position comprising:
- a pivot arm pivotally connected to a first part of the article;
- a lever arm pivotally connected to the pivot arm and movable between an unlocked position and a locked position when the lever arm is drawn downward toward the Second part of the article to draw first and second parts of the article into a closed, locked position, and said lever arm including an end forming an engagement surface;
- locking means positioned on the second part of the article for receiving the engagement surface of the lever arm and locking same when the lever arm is drawn downward into the locked position; and
- extension surface means positioned on the lever arm and extending outwardly from said extension surface means for engaging said locking means and increasing the leverage force during movement between one of into or out of a locked position.

11. A device according to claim 10 wherein said first and second parts of said articles are formed as a cable splice closure housing.

12. A device according to claim 10 wherein said locking means comprises lever arm engaging means for receiving the engagement surface of the lever arm and locking the lever arm in the closed, locked position.

13. A device according to claim 10 wherein said locking means comprises a protrusion for engaging said extension means during movement of said first and second ring members into unlocked and locked positions.

14. A device according to claim 13 wherein said protrusion comprises at least one pin extending from said locking means for engaging said extension means.

15. A device according to claim 13 wherein said extension means comprises a longitudinally extending extension member, including a hook for engaging the protrusion on the locking means and increasing the leverage force of the lever arm during movement into the open, unlocked position from the closed, locked position.

16. A device according to claim 13 wherein said extension means comprises a longitudinally extending extension member having a side surface for engaging said protrusion and increasing the leverage force during movement into the closed, locked position from the open, unlocked position.

17. A device according to claim 10 including means pivotally connecting said lever arm to said pivot arm along a medial portion of the lever arm.

18. A device according to claim 10 wherein said pivot arm includes two opposing ends, and means connecting one end to said first part of said article and means connecting said other end to said lever arm.

19. A device according to claim 10 wherein said extension means comprises at least two parallel, longitudinally extending extension members.

20. A clamp comprising:
- first and second clamp members, each clamp member having ends that are pivotably movable between an open, unlocked position and a closed, locked position;
- a lever arm, and including an end forming an engagement surface;
- mounting means pivotably mounting said lever arm to said first clamp member for movement between an unlocked position and a locked position when the lever arm is drawn downward to bring first and second clamp members together into the closed, locked position;
- locking means positioned on the second clamp member for receiving the engagement surface of the lever arm and locking same when the lever arm is drawn downward into a locked position; and
- extension surface means positioned on the lever arm and extending outwardly from said extension surface means for engaging said locking means and increasing the leverage force of the lever arm during movement between one of into or out of a locked position.

21. A clamp according to claim 20 wherein said mounting means comprises a pivot arm, including two ends, means pivotally mounting one end to said end of the first clamp member, and means pivotally mounting the other end to said lever arm.

22. A clamp according to claim 20 wherein said locking means comprises lever arm engaging means for receiving the engagement surface of the lever arm and locking the lever arm in a locked position.

23. A clamp according to claim 20 wherein said locking means comprises a protrusion for engaging said extension means during movement of said first and second clamp members into open, unlocked and closed, locked positions.

24. A clamp according to claim 20 wherein said protrusion comprises at least one pin extending from said locking means for engaging said extension means.

25. A clamp according to claim 20 wherein said extension means comprises a longitudinally extending extension member, including a hook for engaging the protrusion on the locking means and increasing the leverage force during movement into the locked position from the unlocked position.

26. A clamp according to claim 20 wherein said extension means comprises a longitudinally extending extension member having a side surface for engaging said protrusion and increasing the leverage force during movement into the locked position from the unlocked position.

27. A clamp according to claim 20 including means pivotally mounting said lever arm to said pivot arm along a medial portion of the lever arm.

28. A clamp according to claim 20 wherein said lever arm includes two opposing ends, and means connecting one end to said first clamp member and means pivotally connecting the other end to said lever arm.

29. A clamp according to claim 20 wherein said extension means comprises at least two parallel, longitudinally extending extension members.

* * * * *

UNITED STATES PATENT AND TRADEMARK OFFICE
CERTIFICATE OF CORRECTION

PATENT NO. : 5,829,106
DATED : November 3, 1998
INVENTOR(S) : Dams et al.

It is certified that error appears in the above-identified patent and that said Letters Patent is hereby corrected as shown below:

On the title page, item [57] Abstract
Delete the abstract and replace with the attach abstract -- An over-centre closing device for closing together first and second parts of an article, comprising a lever pivotally attached to an arm which is pivotally mounted to the first part of the article, the lever having an engagement surface which engages the second part of the article and fastens the two parts of the article together when the lever is in its over-centre position in use, wherein the lever has an extension which extends beyond the engagement surface and which may cooperate with the second part of the article to provide initial closing leverage during an initial stage of closing the article and which allows the engagement surface to contact the second part of the article to provide final closing leverage during a final state of closing the article. --.

Column 4, Line 41 delete "17".

Signed and Sealed this

Eighteenth Day of May, 1999

*Attest:*

Q. TODD DICKINSON

*Attesting Officer*   *Acting Commissioner of Patents and Trademarks*